United States Patent [19]

Login

[11] 4,024,112
[45] May 17, 1977

[54] POLYESTERS CONTAINING IONIC GROUPS

[75] Inventor: Robert Bernard Login, Woodhaven, Mich.

[73] Assignee: BASF Wyandotte Corporation, Wyandotte, Mich.

[22] Filed: Dec. 22, 1975

[21] Appl. No.: 642,846

[52] U.S. Cl. .......................................... 260/75 N
[51] Int. Cl.² ...................................... C08G 63/40
[58] Field of Search ............. 260/75 N, 75 S, 75 R

[56] References Cited

UNITED STATES PATENTS

| | | | |
|---|---|---|---|
| 3,634,541 | 1/1972 | Popp et al. | 260/75 S |
| 3,725,351 | 4/1973 | Harrison et al. | 260/75 S |
| 3,734,892 | 5/1973 | Lofquist | 260/75 N |
| 3,787,523 | 1/1974 | Crescentini et al. | 260/75 N X |
| 3,856,753 | 12/1974 | Henry et al. | 260/75 N |
| 3,922,250 | 11/1975 | Cleary | 260/75 S |

*Primary Examiner*—Lucille M. Phynes
*Attorney, Agent, or Firm*—Joseph D. Michaels; Bernhard R. Swick; Robert E. Dunn

[57] ABSTRACT

Polyesters containing ionic groups are prepared by the reaction of an alkylene oxide adduct of a nitrogen-containing compound with (1) a metal salt of an acidic derivative of an organic polycarboxylic ester or (2) an alkoxide-generating reagent followed by reaction with a polycarboxylic anhydride, anhydride acid chloride, or anhydride ester. The polyesters are particularly useful in the preparation of antistatic polymer compositions.

11 Claims, No Drawings

POLYESTERS CONTAINING IONIC GROUPS

BACKGROUND OF THE INVENTION

1. Field of the Invention

The present invention relates to polyesters containing ionic groups and having improved antistatic properties. More particularly, the invention relates to polyesters containing ionic groups derived from alkylene oxide adducts of nitrogen-containing compounds.

2. Prior Art

In copending U.S. Application Ser. No. 453,741 filed Mar. 22, 1974, which application is a division of U.S. Application Ser. No. 177,136 filed Sept. 1, 1971, there is described the preparation of polyesters by the reaction of a hydrogen-reactive compound and an alkylene oxide adduct of a nitrogen-containing compound. These polyesters are disclosed as useful antistatic agents for meltformed polymers.

The present invention is an improvement in the invention disclosed in the aforesaid applications in that it has now been found that a certain class of polyesters containing ionic groups possess improved dye-light fastness and antistatic properties.

SUMMARY OF THE INVENTION

Polyesters containing ionic groups are prepared by the reaction of an alkylene oxide adduct of a nitrogen-containing compound with (1) a metal salt of an acidic derivative of an alkyl ester of an organic polycarboxylic acid or anhydride or (2) an alkoxide-generating reagent followed by reaction with a polycarboxylic anhydride, anhydride acid chloride, or anhydride ester. The polyesters are prepared employing an equivalent ratio of ester group to hydroxyl group of from about 0.25:1 to 0.5:1. The polyesters possess improved dye-light fastness and antistatic properties.

DESCRIPTION OF THE PREFERRED EMBODIMENTS

The present invention relates to new polyesters prepared by the reaction of a metal salt of an acidic derivative of an alkyl ester of an organic polycarboxylic acid or anhydride having the formula:

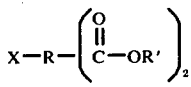

I.

wherein
R is an aliphatic or aromatic radical,
R' is an alkyl group having from 1 to 4 carbon atoms,
X is $SO_3M$, OM, $CO_2M$ or $SO_2M$, and
M is Na, K, Li, Ca, Mg or Ba,
with an alkylene oxide adduct of a nitrogen-containing compound. Optionally, the polyesters may be prepared by the reaction of an aforementioned adduct with an alkoxide-generating reagent such as a pure metal or a metal alcoholate followed by reaction with a compound of the formula:

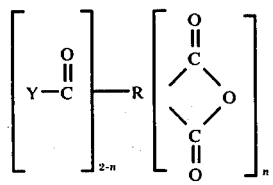

II.

wherein
R is an aliphatic or aromatic radical,
Y is Cl or alkyl having from 1 to 4 carbon atoms, and
n = 1 or 2.

These polyesters generally have a molecular weight ranging from about 25,000 to 500,000 and are thermally stable in nitrogen at temperature of upwards of about 250° C. to 350° C. as measured by thermogravimetric analysis.

The nitrogen-containing compound which is oxyalkylated and employed in the preparation of the polyesters of the subject invention is selected from the group consisting of alkanolamines, polyalkanolamines, alkylene polyamines, polyalkylenepolyamines, and aromatic polyamines. Illustrative of such amines include ethanolamine, propanolamine, isopropanolamine, butanolamine; triethanolamine, triisopropanolamine, stearyldiethanolamine, ethylene diamine, hexamethylene diamine, N,N,N',N'-tetrakis(2-hydroxypropyl) ethylene diamine, diethylene triamine, triethylene tetramine; the phenylene diamines, toluene diamines, and aniline/formaldehyde condensation polymers. Among these useful nitrogen-based compounds particularly preferred are those derived from alkylene polyamines, polyalkanolamines and polyalkylene polyamines, and within these classes ethylene diamine, N,N,N',N'-tetrakis(2-hydroxypropyl) ethylene diamine, triethanolamine and triethylenetetramine.

Still another useful class of nitrogen-containing compounds are the higher alkylene oxide adducts of the above-enumerated nitrogen-containing compounds. For purposes of clarity these higher alkylene oxides are hereinafter referred to as α-olefin oxides. The adducts prepared from the α-olefin oxides are generally made by reacting any of the above-enumerated nitrogen-containing compounds under conventional oxyalkylation conditions with the α-olefin oxide. The useful α-olefin oxides are those having from 10 to 20 carbon atoms, and preferably from 14 to 18 carbon atoms, as well as mixtures thereof.

This class of nitrogen-containing compound is prepared, generally, in a mole ratio of α-olefin oxide to nitrogen-containing compound ranging from about 1:1 to 2:1. Preferred within this class of compounds are the $C_{15}$ to $C_{18}$, or mixtures thereof, adducts of ethanolamine, diethanolamine, and aminoethylethanolamine.

The alkylene oxide used to oxyalkylate the nitrogen-containing or nitrogeneous compound can be either ethylene oxide or a mixture of ethylene oxide and lower alkylene oxides, having from three to four carbon atoms, such as propylene oxide, the butylene oxides, epihalohydrins, and the like wherein the ethylene oxide is present in an amount equal to at least 10% by weight of an alkylene oxide combination. Where a combination of alkylene oxides is employed, the alkylene oxides can be reacted with the nitrogen-containing compound either sequentially or as a random mixture thereof. The alkylene oxides generally constitute from about 60% to 99% by weight of the resulting adduct and, preferably, from about 70% to 98% by weight thereof with the ethylene oxide content of the alkylene oxide ranging from about 10% to 100% by weight of the alkylene oxides and preferably from about 40% to 80% by weight.

The alkylene oxide adducts of the nitrogen-containing compound are prepared under conventional oxyalkylation conditions, e.g. 34 to 90 psi., and at 100° C. to 175° C. and in the presence of a conventional oxyalkylation catalyst. The alkylene oxide adducts of the nitrogen-containing compound, useful herein besides having the above physical properties, have a molecular weight ranging from about 1,000 to 40,000 and preferably from about 5,000 to 30,000. Particularly suitable alkylene oxide adducts of nitrogen-containing compounds useful in the practice of the present invention are found in U.S. Pat. Nos. 3,207,791 and 2,979,528.

As mentioned above, one of the ingredients employed in the preparation of the polyesters of the subject invention is a metal salt of an acidic derivative of an alkyl ester of an organic polycarboxylic acid or anhydride. Organic polycarboxylic acids and anhydrides which may be employed in the preparation of these salts include aliphatic and aromatic acids and anhydrides such as malonic, succinic, glutaric, adipic, pimelic, suberic, azelaic, sebacic, phthalic, isophthalic, terephthalic, 1,4-cyclohexane dicarboxylic, trimellitic and pyromellitic. The acid group is incorporated into the alkyl esters by, for example, sulfonation, sulfination, carboxylation or hydroxylation.

Generally, the lower alkyl esters of the acids or anhydrides will be employed in the preparation of the polyesters. By the phrase "lower alkyl" is meant alkyl having from one to four carbon atoms. Representative alkyl esters include dimethyl malonate, diethyl adipate, dimethyl azelate; dimethyl maleate, diethyl maleate, dibutyl maleate, diethyl succinate, dibutyl succinate and diethylphthalate.

The preferred alkyl esters of dicarboxylic acids are those derived from iso- and terephthalic acid. Representative of these preferred esters are dimethyl terephthalate, diethyl terephthalate, dimethylisophthalate and diethylisophthalate.

In preparing the polyester, the metal salt is reacted with the nitrogen-containing compound in an equivalent ratio of ester group of the salt to hydroxyl group of the nitrogen-containing compound of 0.25:1.0 to 0.5:1.0 and preferably from about 0.3:1.0 to 0.45:1.0. This reaction is usually conducted in an inert atmosphere, e.g., nitrogen, at a temperature ranging from about 60° C. to 160° C. and at either atmospheric pressure or a reduced pressure for a time period ranging from about one hour to ten hours. Preferably, the reaction is carried out at a temperature ranging from about 70° C. to 150° C. and for a period ranging from about 1 hour to 4 hours.

As mentioned above, the polyesters of the subject invention may also be prepared by reacting the nitrogen-containing compound with an alkoxide-generating reagent and subsequently reacting with a compound of Formula II above, namely a polycarboxylic anhydride, anhydride acid chloride or anhydride ester. Representative alkoxide generating reagents include the metals of Groups I and II such as sodium, potassium, lithium, barium, magnesium and calcium, as well as alcoholates of all of these metals. Particularly preferred are the alcoholates of lower aliphatic alcohols such as methanol, ethanol, the propanols and the butanols. Representative polycarboxylic anhydrides which may be used include 1,2,4,5-benzene tetracarboxylic dianhydride, 1,2,3,4-benzene tetracarboxylic dianhydride, 3,3',4,4'-benzophenone tetracarboxylic dianhydride, 1,4,5,8-naphthalene tetracarboxylic dianhydride, bicyclo[2,2,-2]oct-7-ene-2,3,5,6-tetracarboxylic-2,3,5,6-dianhydride, 1,2,3,4-cyclobutane tetracarboxylic dianhydride, 1,2,3,4-cyclopentane tetracarboxylic dianhydride, and tetrahydrofuran-2,3,4,5-tetracarboxylic dianhydride. Representative anhydrides and chlorides include trimellitic anhydride acid chloride and hemimellitic anhydride acid chloride. Representative anhydride esters include alkyl ester of trimellitic anhydride and alkyl ester of hemimellitic anhydride. Generally the amounts of reactants employed are equivalent to the acid generated during opening of the anhydride, or other acid-forming cross-linking functionality.

In preparing these polyesters a catalyst may be employed. Suitable catalysts are either transesterification catalysts which include, for example, sodium hydroxide, potassium hydroxide, and the like, or isocyanate reaction catalysts which are the conventional organometallic catalysts, such as dibutyltin dilaurate and stannous octoate. The catalyst will nominally be employed in catalytic amounts ranging from about 0.01 part to 0.2 part per 100 parts by weight of reactants. Where a transesterification catalyst is employed, it is incumbent to neutralize any residual amounts thereof by known conventional procedures after cessation of the reaction.

The resulting products will range from either a viscous liquid to a hard wax. The hard wax upon subjecting to heat or elevated temperatures, will transform to a highly viscous liquid which for illustrative purposes will have a viscosity at 100° C. ranging from about 200 cps. to about 40,000 cps., the same viscosity range being applicable to the viscous liquid products.

In the Examples which follow, all parts are by weight unless otherwise indicated.

EXAMPLE I

A reactor equipped with a thermometer, stirrer, distillation apparatus and heat exchange means was charged with 1334 parts (0.11 mole) of a polyol having a molecular weight of 12,000, an ethylene oxide content of 60% by weight of the polyol and a propylene oxide content of 40% by weight of the polyol, said polyol prepared by the reaction of ethylene oxide with the propylene oxide adduct of ethylene diamine. The charge was heated to 100° C., placed under vacuum and the temperature increased to 120° C. After stripping the charge for 15 minutes at less than 10 mm. of mercury, the vacuum was relieved with nitrogen. Thereafter 28.5 parts (0.1 mole) of dimethyl 5-sulfoisophthalate sodium salt was added to the charge and the temperature of the charge was raised to 160° C. After an 8 hour period the resulting mixture was filtered to remove the unreacted salt. The product had a hydroxyl number of 11 and a Brookfield viscosity at 100° C. of 32,000 cps.

EXAMPLE II

Following the procedure described in Example I a polyester was prepared from 929 parts (0.12 mole) of a polyol having a molecular weight of 7600, an ethylene oxide content of 70% by weight of the polyol and a propylene oxide content of 30% by weight of the polyol, said polyol prepared by the reaction of propylene oxide with the ethylene oxide adduct of N,N,N',N'-tetrakis(2-hydroxypropyl) ethylene diamine and 30 parts (0.1 mole) of dimethyl 5-sulfoisophthalate sodium salt. The resulting polyester had a hydroxyl number of 18 and a Brookfield viscosity at 100° C. of 12,000 cps.

EXAMPLE III

To a reactor equipped as described in Example I was charged 1100 parts (0.092 moles) of the polyol described in Example I and 3.7 parts (0.07 mole) of sodium methoxide. The charge was heated to 100° C. and placed under a vacuum to remove methanol. The charge was heated to 120° C. and 13 parts (0.062 mole) of trimellitic anhydride acid chloride was then added thereto. The temperature of the charge was raised to 140° C. and the charge was vacuum distilled to remove volatiles. The resulting polyester had a Brookfield viscosity at 100° C. of 7000 cps.

EXAMPLE IV

To a reactor equipped as described in Example I was charged 1503 parts (0.58 mole) of an alkoxylated nitrogen-containing compound having a molecular weight of about 2600 and an oxyethylene content of 80% by weight, said compound prepared by ethoxylation of the adduct of one mole of ethanolamine and two moles of a mixture of $C_{15}$-$C_{18}$ α-olefin oxides, said mixture containing 20% $C_{15}$, 30% $C_{16}$, 30% $C_{17}$ and 20% $C_{18}$ olefin oxides. The charge was mixed with 54.4 parts (1.03 mole) of sodium methoxide heated to 120° C. and placed under vacuum to remove methanol. Thereafter, 110 parts (0.43 mole) of pyromilletic anhydride was added to the charge and the reaction was continued at 120° C. for 1 hour. The resulting polyester was a viscous gel-like material.

EXAMPLE V

To a reaction vessel equipped as described in Example I was charged 2500 parts of an alkoxylated nitrogen-containing compound prepared by reacting a mixture of $C_{14}$-$C_{16}$ α-olefin oxides, the mixture containing about 25% $C_{14}$, 50% $C_{15}$, 25% $C_{16}$ with ethanolamine in a 2:1 mole ratio under conventional oxyalkylation conditions followed thereafter by base catalyzed ethoxylation of the olefin oxidediethanolamine condensate. This alkoxylated nitrogen-containing compound has a molecular weight of about 2600 and contains about 80% by weight of ethylene oxide.

To the unneutralized above intermediate at 160° C. under nitrogen was added 257.5 parts of dimethyl 5-sulfoisophthalate sodium salt. The pressure was reduced thereafter to at least 5 mm. of mercury. Methanol evolution began immediately and was complete in five hours. The viscosity of the mixture increased as methanol was removed until it had finally reached 29,000 cps. as measured on a Brookfield viscometer, spindle No. 4, 30 rpm., at 100° C.

The final product was a light tan solid melting between 25° C.-30° C. and exhibiting a hydroxyl number of 26 and a melt viscosity at 100° C. of 29,000 cps.

EXAMPLE VI

A. Preparation of Polyoxyalkylated Ethylene Diamine

A reactor equipped with a stirrer, thermometer and heating means was charged with 400 parts of N,N,N'N'-tetrakis(2-hydroxypropyl) ethylene diamine and 28 parts of potassium hydroxide (90% flake). The charge was purged with nitrogen, evacuated to less than 10 mm. of mercury and stripped at 125° C. for 1 hour. The vacuum was relieved with nitrogen and the charge was pressurized to 34 psi. The charge was then heated to 135° C. and 2100 of ethylene oxide was added over a period of 4 hours. Upon completion of the oxide addition, the reaction mixture was heated at 135° C. for 1 hour. The mixture was cooled to 60° C. and discharged from the reactor.

A reactor equipped as described above was charged with 100 parts of the product prepared above. After purging with nitrogen and stripping for less than an hour at 135° C. under less than 10 mm. of mercury, the reactor was pressurized to 34 psi. with nitrogen. The charge was then heated to 135° C. and 248 parts of ethylene oxide was added over a 2 hour period. Upon completion of the oxide addition, the reaction mixture was heated for an additional hour. The temperature of the mixture was reduced to 115° C. and 284 parts of propylene oxide was added to the reactor over a period of 2 hours. Upon completion of the propylene oxide addition, the reaction mixture was heated for an additional hour at 115° C., cooled to 60° C. and discharged from the reactor. The resulting product had a hydroxyl number of 25, a hydroxyl molecular weight of 8900, an ethylene oxide content of 55% by weight of the polyol and a propylene oxide content of 45% by weight of the polyol.

B. Preparation of Polyoxyalkylated Polyol Polyester Containing Ionic Groups A reactor equipped as described above was charged with 1000 parts of the polyol described in A, above. The charge was heated to 160° C. and vacuum stripped at less than 5 mm. of mercury for 30 minutes. The vacuum was relieved with nitrogen and 31.5 parts of dimethyl 5-sulfoisophthalate sodium salt was added to the charge. The reaction mixture was sealed and evacuated to 5 mm. of mercury. Methanol evolution began immediately and lasted for four hours. As methanol was removed, the viscosity of the mixture increased. The resulting product, a light tan solid, had a melting point of 30° C.-35° C., a hydroxyl number of 16, and a melt viscosity at 100° C. of 35,500 cps.

EXAMPLE VII

A. Preparation of Polyoxyalkylated Ethylene Diamine

A reactor equipped with a stirrer, thermometer and heating means was charged with 400 parts of N,N,N',N'-tetrakis(2-hydroxypropyl) ethylene diamine and 28 parts of potassium hydroxide (90% flake). The charge was purged with nitrogen, evacuated to less than 10 mm. of mercury and stripped at 125° C. for 1 hour. The vacuum was relieved with nitrogen and the charge was pressurized to 34 psi. The charge was then heated to 135° C. and 2100 parts of ethylene oxide was added over a period of 4 hours. Upon completion of the oxide addition, the reaction mixture was heated at 135° C. for 1 hour. The mixture was cooled to 60° C. and discharged from the reactor.

A reactor equipped as described above was charged with 100 parts of the product prepared above. After purging with nitrogen and stripping for less than an hour at 135° C. under less than 10 mm. of mercury, the reactor was pressurized to 34 psi. with nitrogen. The charge was then heated to 135° C. and 248 parts of ethylene oxide was added over a 2 hour period. Upon completion of the oxide addition, the reaction mixture was heated for an additional hour. The temperature of the mixture was reduced to 115° C. and 523 parts of propylene oxide was added to the reactor over a period of two hours. Upon completion of the propylene oxide addition, the reaction mixture was heated for an additional hour at 115° C., cooled to 60° C. and discharged from the reactor. The resulting product had a hydroxyl number of 22, a hydroxyl molecular weight of 10,200, an ethylene oxide content of 40% by weight of the polyol and a propylene oxide content of 60% by weight of the polyol.

B. Preparation of Polyoxyalkylated Polyol Polyester Containing Ionic Groups

A reactor equipped as described above was charged with 1000 parts of the polyol described in A, above. The charge was heated to 160° C. and vacuum stripped at less than 5 mm. of mercury for 30 minutes. The vacuum was relieved with nitrogen and 25.9 parts of dimethyl 5-sulfoisophthalate sodium salt was added to the charge. The reaction temperature was raised to 160° C. and the reaction continued for about 1 hour. The product was then stripped at 160° C., removing methanol for about 4 hours. The resulting product had a hydroxyl number of 14.4 and a melt viscosity at 100° C. of 4300 cps.

EXAMPLE VIII

The surface resistivity of the polyoxylated polyol polyesters prepared in Examples I-VII was evaluated employing a Keithly apparatus at 10%, 20% and 30% relative humidity. The apparatus consists of an electrometer (Model 610C), a power supply (Model 240A) and a resistivity adapter (Model 610S). In addition, an automatic relative humidity control system was employed. The resistivity values of the polyesters are obtained by measuring resistance and converting it to resistivity. This is accomplished with an electrode configuration into which a sample is inserted. The resistance measurement is facilitated by applying a potential to the sample and determining the resultant current. The surface resistivity is calculated from the following equation:

$$\rho s = 53.36 \times (V/I) \text{ ohms}$$

where $\rho s$ = surface resistivity

V = voltage setting (volts)
I = current reading (amps)

In the evaluations, samples were prepared by melting small quantities (approximately 0.5 gram) of the polyester on three glass plates, spreading the samples uniformly on the plate and conditioning from 48 hours to 72 hours at 10% relative humidity. The samples were then evaluated in triplicate, conditioned for 24 hours at 20% RH and evaluated and conditioned for 24 hours at 30% and evaluated. Average results of these measurements are presented in the Table, below.

| Product of Example | Surface Resistivity, ohms | | |
|---|---|---|---|
| | 10% RH | 20% RH | 30% RH |
| I | $4.0 \times 10^8$ | $3.2 \times 10^8$ | $8.7 \times 10^7$ |
| II | $4.1 \times 10^9$ | $2.0 \times 10^9$ | $8.8 \times 10^8$ |
| III | $2.5 \times 10^{11}$ | $5.1 \times 10^9$ | $1.6 \times 10^9$ |
| IV | $4.0 \times 10^{10}$ | $1.6 \times 10^{10}$ | $8.5 \times 10^8$ |
| V | $5.0 \times 10^{10}$ | $2.5 \times 10^{10}$ | $1.2 \times 10^{10}$ |
| VI | $3.9 \times 10^9$ | $2.1 \times 10^9$ | $9.1 \times 10^8$ |
| VII | $3.3 \times 10^9$ | $1.6 \times 10^9$ | $8.2 \times 10^8$ |

-continued

| Product of Example | Surface Resistivity, ohms | | |
|---|---|---|---|
| | 10% RH | 20% RH | 30% RH |

RH = Relative Humidity

The values presented in the above Table indicate that the products possess utility as antistat additives particularly as internal antistat additives for polyamide polymers.

The embodiments of the invention in which an exclusive property or privilege is claimed are defined as follows:

1. A polyester containing ionic groups prepared by the reaction of (a) an alkylene oxide adduct of a nitrogen-containing compound having a molecular weight from about 1,000 to 40,000 and an alkylene oxide content of from about 60% to 90% by weight, said alkylene oxide content being at least 10% by weight ethylene oxide, with (b) a compound of the formula:

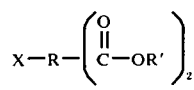

wherein
R is an aliphatic or aromatic radical,
R' is an alkyl group having from 1 to 4 carbon atoms,
X is $SO_3M$, OM, $CO_2M$ or $SO_2M$, and
M is Na, K, Li, Ca, Mg or Ba, or (c) an alkoxide-generating reagent and a compound of the formula:

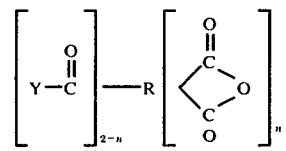

wherein
R is an aliphatic or aromatic radical,
Y is Cl or alkyl having from 1 to 4 carbon atoms, and
n = 1 or 2 employing an equivalent ratio of ester group of (b) or (c) to hydroxyl group of (a) of from about 0.25:1 to 0.5:1.

2. The polyester of claim 1 wherein (a) is a propylene oxide adduct of the condensation of ethylene oxide with N,N,N',N'-tetrakis(2-hydroxypropyl) ethylene diamine.

3. The polyester of claim 1 wherein (a) constitutes from about 40% to 80% by weight of ethylene oxide.

4. The polyester of claim 1 wherein (a) has a molecular weight of from about 5,000 to 30,000.

5. The polyester of claim 1 wherein the nitrogen-containing compound is selected from the group consisting of alkanolamines, polyalkanolamines, alkylene polyamines, polyalkylenepolyamines and aromatic polyamines.

6. The polyester of claim 1 wherein R is aromatic.

7. The polyester of claim 1 wherein R is isophthalic, X is $SO_3Na$ and R' is methyl.

8. The polyester of claim 1 wherein R is aromatic and n is 2.

9. The polyester of claim 1 wherein R' is methyl.

10. A process for the preparation of a polyester containing ionic groups which comprises reacting an alkylene oxide adduct of a nitrogen-containing compound with a compound of the formula:

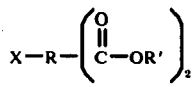     I.

wherein
R is an aliphatic or aromatic radical,
R' is an alkyl group having from 1 to 4 carbon atoms,
X is $SO_3M$, OM, $CO_2M$ or $SO_2M$, and
M is Na, K, Li, Ca, Mg or Ba, employing an equivalent ratio of ester group to hydroxyl group of from about 0.25:1 to 0.5:1.

11. A process for the preparation of a polyester containing ionic groups which comprises reacting an alkylene oxide adduct of a nitrogen-containing compound with an alkoxide-generating reagent and a compound of the formula:

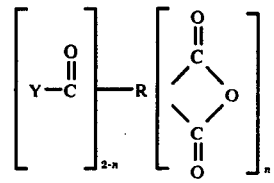     II.

wherein
R is an aliphatic or aromatic radical,
Y is Cl or alkyl having from 1 to 4 carbon atoms, and
n = 1 or 2 employing an equivalent ratio of ester group to hydroxyl group of from about 0.25:1 to 0.5:1.

* * * * *